United States Patent
Yan

(10) Patent No.: US 10,362,001 B2
(45) Date of Patent: Jul. 23, 2019

(54) METHOD AND APPARATUS FOR PROVIDING SECURE COMMUNICATIONS BASED ON TRUST EVALUATIONS IN A DISTRIBUTED MANNER

(71) Applicant: Nokia Technologies Oy, Espoo (FI)

(72) Inventor: Zheng Yan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 486 days.

(21) Appl. No.: 14/431,056

(22) PCT Filed: Oct. 17, 2012

(86) PCT No.: PCT/CN2012/083081
§ 371 (c)(1),
(2) Date: Mar. 25, 2015

(87) PCT Pub. No.: WO2014/059622
PCT Pub. Date: Apr. 24, 2014

(65) Prior Publication Data
US 2015/0256517 A1    Sep. 10, 2015

(51) Int. Cl.
*H04L 29/06* (2006.01)
*H04L 9/08* (2006.01)
*H04L 9/14* (2006.01)

(52) U.S. Cl.
CPC ........ *H04L 63/0428* (2013.01); *H04L 9/0847* (2013.01); *H04L 9/14* (2013.01);
(Continued)

(58) Field of Classification Search
CPC combination set(s) only.
See application file for complete search history.

(56) References Cited

U.S. PATENT DOCUMENTS

| 7,263,619 B1 | 8/2007 | Kim |
| 7,707,122 B2 | 4/2010 | Hull et al. |

(Continued)

FOREIGN PATENT DOCUMENTS

| CN | 1422035 A | 6/2003 |
| CN | 1741527 A | 3/2006 |

(Continued)

OTHER PUBLICATIONS

Sun et al., "Defense of Trust Management Vulnerabilities in Distributed Networks", IEEE Communications Magazine, vol. 46, Issue: 2, Feb. 2008, pp. 112-119.
(Continued)

*Primary Examiner* — Simon P Kanaan
(74) *Attorney, Agent, or Firm* — Mintz Levin Cohn Ferris Glovsky and Popeo, P.C.

(57) ABSTRACT

An approach is provided for providing secure communications based on trust evaluation in a distributed manner. A method can comprises: sending data to a plurality of devices, the data being encrypted with a communication key; encrypting the communication key with public attribute keys associated with attributes, wherein the attributes comprising at least one trust level related attribute representing an access condition for the data based on a trust level; evaluating a trust level of each device of the plurality of devices, to identify eligible devices of the plurality of devices whose trust levels satisfy the access condition; sending the encrypted communication key to the plurality of devices; and sending secret attribute keys associated with the attributes to each device of the eligible devices for decrypting the encrypted communication key, the secret attribute keys being personalized for the each device of the eligible devices.

20 Claims, 5 Drawing Sheets

(52) U.S. Cl.
CPC .......... *H04L 63/061* (2013.01); *H04L 63/065* (2013.01); *H04L 9/0825* (2013.01); *H04L 2209/24* (2013.01); *H04L 2463/062* (2013.01)

(56) References Cited

U.S. PATENT DOCUMENTS

| | | | |
|---|---|---|---|
| 2003/0099361 | A1 | 5/2003 | Uchida |
| 2003/0126464 | A1* | 7/2003 | McDaniel ............. G06F 21/604 726/4 |
| 2004/0228492 | A1 | 11/2004 | Park |
| 2005/0039031 | A1 | 2/2005 | Mont et al. |
| 2006/0023887 | A1 | 2/2006 | Agrawal et al. |
| 2006/0184997 | A1 | 8/2006 | La Rotonda et al. |
| 2006/0233377 | A1 | 10/2006 | Chang et al. |
| 2007/0055867 | A1 | 3/2007 | Kanungo et al. |
| 2007/0192830 | A1 | 8/2007 | O'Connor |
| 2007/0214357 | A1 | 9/2007 | Baldus et al. |
| 2008/0084294 | A1 | 4/2008 | Zhiying et al. |
| 2008/0165974 | A1 | 7/2008 | Inoue et al. |
| 2009/0046676 | A1 | 2/2009 | Krishnaswamy et al. |
| 2009/0049514 | A1 | 2/2009 | Yan et al. |
| 2009/0125980 | A1 | 5/2009 | Alperovitch et al. |
| 2009/0225988 | A1 | 9/2009 | Yamazaki |
| 2009/0276233 | A1 | 11/2009 | Brimhall et al. |
| 2009/0296939 | A1 | 12/2009 | Struik et al. |
| 2009/0328148 | A1 | 12/2009 | Lee et al. |
| 2010/0119068 | A1 | 5/2010 | Harris |
| 2010/0251334 | A1 | 9/2010 | Xiao et al. |
| 2010/0262706 | A1 | 10/2010 | Rodriguez et al. |
| 2010/0329463 | A1 | 12/2010 | Ratliff et al. |
| 2012/0174219 | A1 | 7/2012 | Hernandez et al. |
| 2012/0203832 | A1 | 8/2012 | Vastardis et al. |
| 2012/0260094 | A1 | 10/2012 | Asim et al. |
| 2014/0164776 | A1* | 6/2014 | Hook ........................ H04L 9/14 713/171 |

FOREIGN PATENT DOCUMENTS

| | | |
|---|---|---|
| CN | 101442403 A | 5/2009 |
| CN | 101557289 A | 10/2009 |
| CN | 101707524 A | 5/2010 |
| CN | 101969647 A | 2/2011 |
| CN | 102546161 A | 7/2012 |
| GB | 2398712 A | 8/2004 |
| GB | 2411801 A | 9/2005 |
| JP | 2012-039244 A | 2/2012 |
| WO | 2006/114751 A2 | 11/2006 |
| WO | 2008/082597 A2 | 7/2008 |
| WO | 2009/127225 A1 | 10/2009 |
| WO | 2010/118278 A2 | 10/2010 |
| WO | 2010/144301 A2 | 12/2010 |
| WO | 2011/073894 A1 | 6/2011 |
| WO | 2011/116528 A1 | 9/2011 |

OTHER PUBLICATIONS

Yan et al., "Trust Modeling and Management: from Social Trust to Digital Trust", Chapter :13, Computer Security, Privacy and Politics: Current Issues, Challenges and Solutions, 2007, pp. 1-26.
Yan et al., "Formalizing Trust Based on Usage Behaviours for Mobile Applications", Proceedings of the 6th International Conference on Autonomic and Trusted Computing, Jul. 2009, pp. 194-208.
Lewko et al., "Decentralizing Attribute-Based Encryption", Proceedings of the 30th Annual international conference on Theory and applications of cryptographic techniques: advances in cryptology, 2011, pp. 1-31.
Dellarocas, "Immunizing Online Reputation Reporting Systems Against Unfair Ratings and Discriminatory Behavior", Proceedings of the 2nd ACM conference on Electronic commerce, Oct. 17-20, 2000, pp. 150-157.
Ekberg et al., "OnBoard Credentials Platform Design and Implementation", NRC-TR-2008-001, Jan. 29, 2008, pp. 1-52.
Salem et al., "Fuelling WiFi Deployment: A Reputation-Based Solution", In Proceedings of WiOpt, 2004, 7 pages.
Sun et al., "A Novel Reputation System Facilitating Cooperation in Pervasive Wireless Environment", Canadian Conference on Electrical and Computer Engineering, vol. 2, May 2-5, 2004, pp. 951-954.
Non-Final Office action received for corresponding U.S. Appl. No. 12/570,031, dated Nov. 2, 2011, 12 pages.
Ahtiainen et al., "Awareness Networking in Wireless Environments: Means of Exchanging Information", IEEE Vehicular Technology Magazine, vol. 4, No. 3, Sep. 2009, pp. 48-54.
Bethencourt et al., "Ciphertext-Policy Attribute-Based Encryption", IEEE Symposium on Security and Privacy, May 20-23, 2007, 15 pages.
Goyal et al., "Attribute-Based Encryption for Fine-Grained Access Control of Encrypted Data", Proceedings of the 13th ACM Conference on Computer and Communications Security, Oct. 30-Nov. 3, 2006, pp. 89-98.
Sahai et al., "Fuzzy Identity-Based Encryption", Proceedings of the 24th annual international conference on Theory and Applications of Cryptographic Techniques, 2005, pp. 457-473.
Yang et al., "Hierarchical Attribute-Based Encryption for Fine-Grained Access Control in Cloud Storage Services", Proceedings of the 17th ACM conference on Computer and communications security, 2010, pp. 735-737.
Muller et al., "Distributed Attribute-Based Encryption", Information Security and Cryptology—ICISC, vol. 5461, 2008, pp. 20-36.
"Advogato's Trust Metric", Advogato, Retrieved on Nov. 28, 2014, Webpage available at : http://www.advogato.org/trust-metric.html.
"Building Scalable Web Applications Using the Cloud", Advogato, Retrieved on Jul. 8, 2016, Webpage available at : http://www.advogato.org.
Stuedi et al., "Ad Hoc Social Networking Using MAND", Demo at the 14th International Conference on Mobile Computing and Networking (MobiCom '08), Sep. 14-19, 2008, 3 pages.
"Asian Delight Express—Best Thai Food", Open Junction, Retrieved on Jun. 30, 2016, Webpage available at : http://www.openjunction.org/.
"Systems & Networking Research Group UIUC", SYNRG Micro Blog, Retrieved on Jun. 30, 2016, Webpage available at : http://synrg.csl.illinois.edu/.
"Securing Community Networks", Dr. Dobb's, Retrieved on Oct. 9, 2014, Webpage available at : http://www.drdobbs.com/mobile/securing-community-networks/218700149.
Yan et al., "AdChatRep: A Reputation System for MANET Chatting", Proceedings of 1st international symposium on From digital footprints to social and community intelligence, Sep. 18, 2011, pp. 43-48.
Zhou et al., "Piracy-Preserved Access Control for Cloud Computing", 10th International Conference on Trust, Security and Privacy in Computing and Communications, Nov. 16-18, 2011, pp. 83-90.
Lacharite et al., "A Trust-Based Security Architecture for Tactical MANETs", IEEE Military Communications Conference, Nov. 16-19, 2008, pp. 1-7.
Khamayseh et al., "Malicious Nodes Detection in MANETs: Behavioral Analysis Approach", Journal of Networks, vol. 7, No. 1, Jan. 2012, pp. 116-125.
Zhou et al., "Trust Overlay Networks for Global Reputation Aggregation in P2P Grid Computing", 20th International Parallel and Distributed Processing Symposium, Apr. 25-29, 2006, 10 pages.
Chen, "A Privacy-Enhanced Reputation System for Mobile Ad Hoc Services", Masters Thesis, Jun. 28, 2010, 71 pages.
"Wireless and Networking Research Group", Microsoft, Retrieved on Jun. 30, 2016, Webpage available at : https://www.microsoft.com/en-us/research/group/wireless-and-networking-research-group/.
"Familiar Stranger:Anxiety, Comfort, and Play in Public Places", Intel Research, Retrieved on Jun. 30, 2016, Webpage available at : http://www.paulos.net/research/intel/familiarstranger/index.htm.
Ott et al., "Floating Content for Probabilistic Information Sharing", Pervasive and Mobile Computing, vol. 7, No. 6, Dec. 2011, pp. 671-689.

(56) References Cited

OTHER PUBLICATIONS

Chen et al., "Implementation of a Reputation System for Pervasive Social Networking", IEEE 10th International Conference on Trust, Security and Privacy in Computing and Communications, Nov. 16-18, 2011, pp. 857-862.
Ghosh et al., "Towards Designing a Trusted Routing Solution in Mobile Ad Hoc Networks", Mobile Networks and Applications, vol. 10, No. 6, Dec. 2005, pp. 985-995.
"Web of Trust for MANETs", CMSC 691: Research Proposal, Sep. 5, 2005, 29 pages.
Chezhian et al., "Security Requirements in Mobile Ad Hoc Networks", International Journal of Advanced Research in Computer and Communication Engineering, vol. 1, No. 2, Apr. 2012, pp. 45-49.
International Search Report and Written Opinion received for corresponding Patent Cooperation Treaty Application No. PCT/CN2012/073415, dated Jan. 3, 2013, 18 pages.
Non-Final Office action received for corresponding United States Patent Application No. 14/373,592, dated Oct. 15, 2015, 8 pages.
Yan et al., "TruBeRepec: A Trusted-Behavior-Based Reputation and Recommender System for Mobile Applications", Journal Personal and Ubiquitous Computing, vol. 16, No. 5, Jun. 2012, pp. 485-506.
Jawad et al., "A Data Privacy Service for Structured P2P Systems", Mexican International Conference on Computer Science, Sep. 21-25, 2009, pp. 45-56.
Extended European Search Report received for corresponding European Patent Application No. 12870702.3, dated Oct. 22, 2015, 7 pages.
Baden et al., "Persona: An Online Social NetworkWith User-Defined Privacy", Proceedings of the ACM SIGCOMM 2009 conference on Data communication, Aug. 17-21, 2009, 12 pages.
Roy et al., "Secure Data Retrieval Based on Ciphertext Policy Attribute-Based Encryption (CP-ABE) System for the DTNs", Lehigh CSE Tech. Report, 2009, 11 pages.
Chen et al., "Secure, Selective Group Broadcast in Vehicular Networks Using Dynamic Attribute Based Encryption", The 9th IFIP Annual Mediterranean Ad Hoc Networking Workshop, Jun. 23-25, 2010, pp. 1-8.
Extended European Search Report received for corresponding European Patent Application No. 12873227.8, dated Nov. 6, 2015, 6 pages.
Ibraimi et al., "Secure Management of Personal Health Records by Applying Attribute-Based Encryption", 6th International Workshop on Wearable Micro and Nano Technologies for Personalized Health, Jun. 24-26, 2009, 4 pages.
Extended European Search Report received for corresponding European Patent Application No. 12886856.9, dated Jun. 7, 2016, 7 pages.
Non-Final Office action received for corresponding U.S. Appl. No. 14/385,497, dated Dec. 9, 2015, 32 pages.
Final Office action received for corresponding U.S. Appl. No. 14/385,497, dated Jun. 17, 2016, 22 pages.
Final Office action received for corresponding U.S. Appl. No. 14/373,592, dated Mar. 28, 2016, 3 pages.
Office action received for corresponding Chinese Patent Application No. 201280070988.8, dated Jul. 1, 2016, 11 pages of office action and 3 pages of office action translation available.
Office action received for corresponding Chinese Patent Application No. 201280072089.1, dated Jul. 6, 2016, 13 pages of office action and 6 pages of office action translation available.
European Office Action received for corresponding European Patent Application No. 12873227.8, dated Sep. 19, 2016, 4 pages.
Josang et al., "A Survey of Trust and Reputation Systems for Online Service Provision", Decision Support Systems, vol. 43, No. 2, Mar. 2007, pp. 618-644.
Office action received for corresponding Chinese Patent Application No. 201280076409.0, dated Jan. 4, 2017, 5 pages of office action and no pages of office action translation available.
European Office Action received for corresponding European Patent Application No. 12886856.9, dated Jan. 9, 2017, 4 pages.
Jahid et al., "DECENT: A Decentralized Architecture for Enforcing Privacy in Online Social Networks", IEEE International Conference on Pervasive Computing and Communications Workshops, 2012, 7 pages.
International Search Report and Written Opinion received for corresponding Patent Cooperation Treaty Application No. PCT/CN2012/083081, dated Jul. 18, 2013, 10 pages.

\* cited by examiner

METHOD AND APPARATUS FOR PROVIDING SECURE COMMUNICATIONS BASED ON TRUST EVALUATIONS IN A DISTRIBUTED MANNER

RELATED APPLICATION

This application was originally filed as Patent Cooperation Treaty Application No. PCT/CN2012/083081 filed Oct. 17, 2012.

FIELD OF THE INVENTION

The present invention generally relates to communications. More specifically, the invention relates to providing secure communications based on trust evaluations in a distributed manner, for example in a pervasive social networking.

BACKGROUND

The modern communications era has brought about a tremendous expansion of communication networks. Communication service providers (e.g., wireless, cellular, internet, etc.) and device manufacturers are continually challenged to deliver value and convenience to consumers by, for example, providing compelling network services, applications and contents. One area of interest has been the development of social networking services and other services for making connections and communicating data, contents or resources among users. One exemplary service is that user equipments such as personal mobile devices (e.g., smart phones) can be self-organized and communicate with each other for social activities, for example by forming a multi-hop radio network, and maintaining connectivity in a decentralized manner. Such kind of social networking based on mobile devices that supports instant and pervasive social activities can be called as pervasive social networking (PSN).

It is crucial to ensure the security of the communication, for example to avoid malicious eavesdropping. However, it is difficult to provide a secure communication in a distributed manner, in which situations there is no centralized server, for example in a distributed communication network. Moreover, in some situations (e.g., disasters, military activities), it is hard to connect to a centralized server. Thus, a secure communication and access control solution based on a traditional centralized server may not be applicable for the distributed communication in some situations. Thus, service providers and device manufacturers face significant technical challenges to provide secure communications in a distributed manner.

SOME EXAMPLE EMBODIMENTS

To overcome limitations in the prior art described above, and to overcome other limitations that will be apparent upon reading and understanding the present specification, the disclosure provides an approach for providing a secure communication based on trust evaluations in a distributed manner (i.e. without any support of a centralized server).

According to one embodiment, a method comprises sending data to a plurality of devices, the data being encrypted with a communication key. The method further comprises encrypting the communication key with public attribute keys associated with attributes, for example according to an attribute-based encryption (ABE) scheme, wherein the attributes comprising at least one trust level related attribute representing an access condition for the data based on a trust level. The method further comprises evaluating a trust level of each device of the plurality of devices, to identify eligible devices of the plurality of devices whose trust levels satisfy the access condition. The method further comprises sending the encrypted communication key to the plurality of devices; and sending secret attribute keys associated with the attributes to each device of the eligible devices for decrypting the encrypted communication key, the secret attribute keys being personalized for the each device of the eligible devices.

In an exemplary embodiment, the method can further comprise re-evaluating the trust level of the eligible devices after sending the secret attribute keys to re-identify eligible devices whose re-evaluated trust levels satisfy the access condition; and when a device of the eligible devices becomes ineligible, updating the communication key to a new communication key, and sending the new communication key encrypted with the public attribute keys to the re-identified eligible devices.

In an exemplary embodiment, the method can further comprise setting the access condition for the data.

In an exemplary embodiment, the method can further comprise informing an access policy of the data to the eligible devices, wherein the access policy indicates a corresponding access condition to be used for a particular access context, wherein the secret attribute keys can be generated based on the identity of the each device of the eligible devices and the at least one trust level related attribute representing the corresponding access condition indicated by the access policy.

In an exemplary embodiment, the method can further comprise using the communication key to decrypt data received from some devices.

In some exemplary embodiments, the sending of at least one of the encrypted communication key and the secret attribute keys can be performed in response to a request from at least one device of the plurality of devices. In some exemplary embodiments, the trust level related attribute can indicate a pre-determined threshold of trust level, and a device whose trust level meets the pre-determined threshold of trust level can be identified as an eligible device. In some exemplary embodiments, the trust level of the each device of the plurality of devices can be evaluated based on social networking activities related to the each device.

In some exemplary embodiments, the communication key is a symmetric key.

In some exemplary embodiments, the encrypted data are broadcasted or multicast to the plurality of devices. In some exemplary embodiments, the encrypted communication key is multicast to the eligible devices together with the secret attribute keys.

According to another embodiment, an apparatus comprising at least one processor, and at least one memory including computer program code, the at least one memory and the computer program code configured to, with the at least one processor, cause, at least in part, the apparatus to send data to a plurality of devices, the data being encrypted with a communication key. The apparatus is further caused to encrypt the communication key with public attribute keys associated with attributes, e.g., according to an attribute-based encryption (ABE) scheme. The attributes can comprise at least one trust level related attribute representing an access condition for the data based on a trust level. The apparatus is further caused to evaluate a trust level of each device of the plurality of devices, to identify eligible devices of the plurality of devices whose trust levels satisfy the access condition. The apparatus is further caused to send the encrypted communication key to the plurality of devices. The apparatus is further caused to send secret attribute keys associated with the attributes to each device of the eligible devices for decrypt the encrypted communication key, wherein the secret attribute keys being personalized for the each device of the eligible devices.

According to another embodiment, a computer-readable storage medium carrying one or more sequences of one or more instructions which, when executed by one or more processors, cause, at least in part, an apparatus to send data to a plurality of devices, the data being encrypted with a communication key. The apparatus is further caused to encrypt the communication key with public attribute keys associated with attributes, e.g., according to an attribute-based encryption (ABE) scheme. The attributes can comprise at least one trust level related attribute representing an access condition for the data based on a trust level. The apparatus is further caused to evaluate a trust level of each device of the plurality of devices, to identify eligible devices of the plurality of devices whose trust levels satisfy the access condition. The apparatus is further caused to send the encrypted communication key to the plurality of devices. The apparatus is further caused to send secret attribute keys associated with the attributes to each device of the eligible devices for decrypting the encrypted communication key, wherein the secret attribute keys being personalized for the each device of the eligible devices.

According to another embodiment, an apparatus comprises means for sending data to a plurality of devices, the data being encrypted with a communication key. The apparatus also comprises means for encrypting the communication key with public attribute keys associated with attributes, e.g., according to an attribute-based encryption (ABE) scheme, wherein the attributes comprising at least one trust level related attribute representing an access condition for the data based on a trust level. The apparatus also comprises means for evaluating a trust level of each device of the plurality of devices, to identify eligible devices of the plurality of devices whose trust levels satisfy the access condition. The apparatus also comprises means for sending the encrypted communication key to the plurality of devices; and means for sending secret attribute keys associated with the attributes to each device of the eligible devices for decrypting the encrypted communication key, the secret attribute keys being personalized for the each device of the eligible devices.

Through various embodiments, communications can be controlled automatically in a secure and efficient way. Meanwhile, each communication device can control its data communications with a personalized access policy. In this regard, a local trust level can be used to control access of data in the communications based on distributed trust evaluation. Any device can select other devices with, for example at least a minimum level of local trust, for secure communications. On the other hand, the devices with a lower trust level cannot access its communication data. The secure communications can be provided in a flexible way based on a distributed trust evaluation by issuing a communication key using a trust controlled attribute-based encryption.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1:
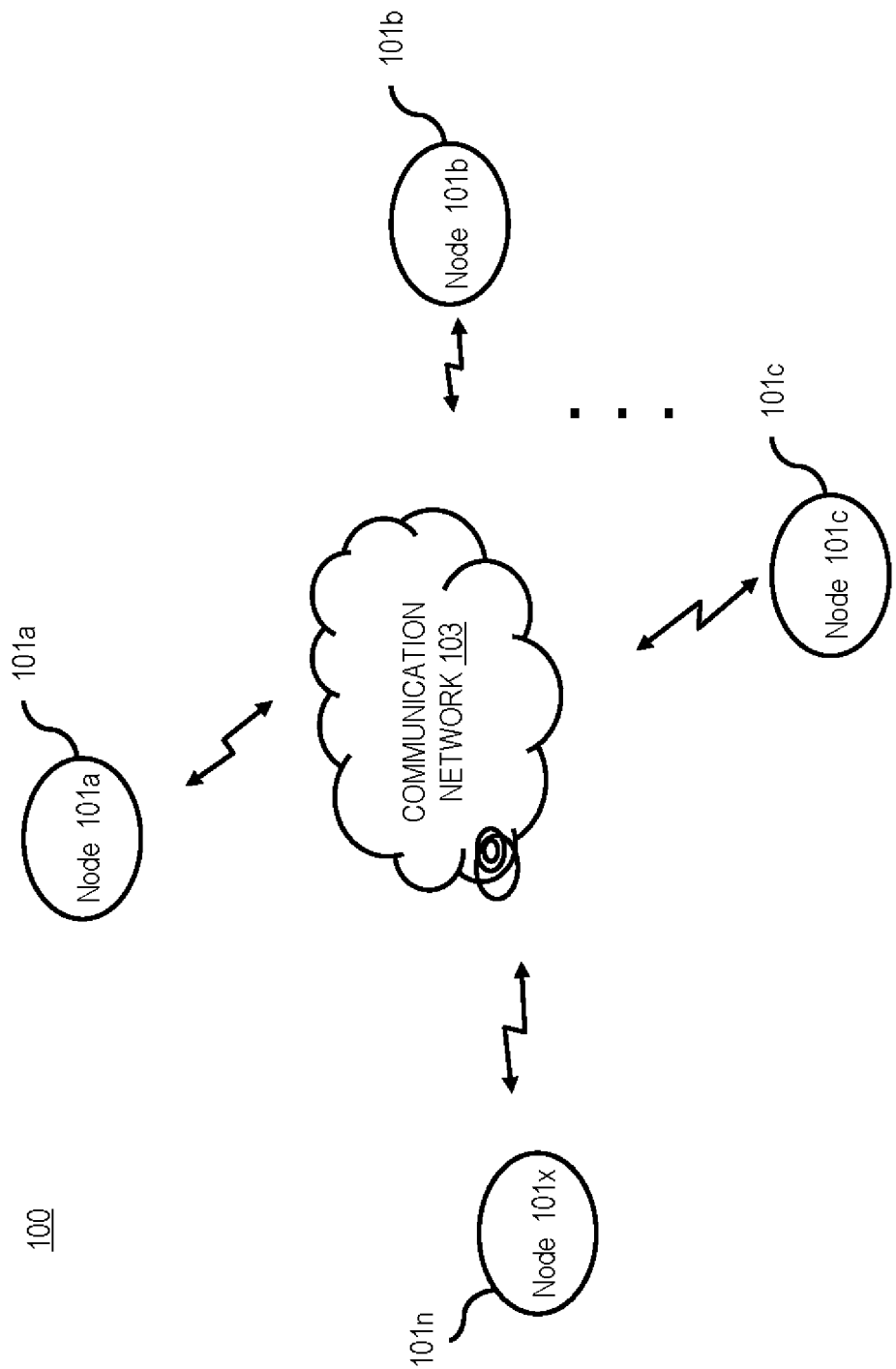
FIG. 1 is a diagram of a system capable of providing secure a communication based on trust evaluations in a distributed manner according to an embodiment.

Examples of a method, apparatus, and computer program for providing secure communications based on a trust level in a distributed manner are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Like reference numerals refer to like elements throughout. The terms "data", "content", "information", and similar terms may be used interchangeably, according to some example embodiments of the present invention, to refer to data capable of being transmitted, received, operated on, and/or stored.

Various exemplary embodiments of the present invention are directed to the generation, distributing, and utilization of security keys in a distributed manner for providing a secure communication. The communication may be implemented in, for example, a pervasive social networking (PSN), in which personal mobile devices (e.g., smart phones) can be self-organized and communicate with each other for social activities by forming a multi-hop radio network and maintaining connectivity in a decentralized manner. For example, a user may want to query people in vicinity using his/her mobile device about which shop is on sale, which movie is recommended to see, or which mobile application should be installed for tagging the locations of photos. Then, some people in vicinity may respond these queries by providing their recommendations via the PSN. In another example, users may also chat with people nearby via the PSN with regard to sharing a taxi ride, or sharing the cost of a series of movie tickets, or the like. Moreover, they may seek services or aids from strangers in vicinity through the PSN. In another example, people who are strangers but regularly in the same public places may want to make an instant appointment for a face-to-face meeting. This kind of social networking is very valuable for the mobile users, especially when fixed networks (e.g., Internet) or cellular networks are temporarily unavailable or costly to access.

The communication networks such as mobile ad hoc network (MANET), Bluetooth network, Wireless Local Area Network (WLAN), cellular network, and the like has a good prospect of becoming a practical platform for such distributed communications. For example, nowadays, a mobile ad hoc network (MANET) has become a practical platform for pervasive social networking and computing, playing as a valuable extension and complement of traditional Internet social networks. Several research groups in the academia have focused on social activities based on the mobile ad hoc network (MANET). For example, Stanford MobiSocial Group has developed Junction, which is a mobile ad hoc and multiparty platform for MANET applications (which can be retrieved from http://openjunction.org/). SyNRG in Duke University has developed Microblog (which can be retrieved from http://synrg.ee.duke.edu/microblog.html), which can help users to post micro-blogs tagged by locations. ETHz Systems Group has introduced AdSocial (which can be retrieved from http://www.iks.inf.ethz.ch/publications/files/mobicom08_demo.pdf), which can provide a pervasive social communication platform. Floating content concept was analyzed based on a theoretical framework to study the fundamental quantities of an ephemeral content sharing service in opportunistic networking, such as a node encounter rate, mean contact times as a function of location, achievable transmission rates and transmission ranges. In a proposed floating content system, content is only shared within an anchor zone in a best-effort manner, i.e., copies are kept available within that zone while they are deleted outside the anchor zone.

In industry, quite a number of companies, such as Microsoft, Nokia and Intel have conducted researches in the area of PSN. For example, Microsoft Research Asia developed an EZSetup system in order to make a mobile user find services provided by his/her neighbors (retrieved from http://research.microsoft.com/en-us/groups/wn/mssn.aspx). The Nokia Instant Community (NIC) (https://lausanne.nokiaresearch.com/nic/) developed by the Nokia Research Center provides an instant social networking platform to allow people in vicinity to communicate, get to know, and share information and data with each other. Similarly, the Intel Berkeley Lab ran a project named Familiar Stranger based on mobile devices to extend our feelings and relationships with strangers that we regularly observe but do not interact with in public places (which can be retrieved from http://www.paulos.net/research/intel/familiarstranger/index.htm). However, none of them pursue how to make use of the trust established in social networking for providing a secure communication in a distributed manner.

Trust plays an important role in the pervasive social networking, such as for reciprocal activities among nearby strangers. It helps people overcome perceptions of uncertainty and risk and engages in "trust-related behaviors". During the instant social activities, users are not necessarily acquaintances but more likely to be strangers. Therefore, the users need to balance between the benefits received in such reciprocal activities and the risks related to communications with strangers. In this context, it is important to figure out how much users should trust with each other in order to make decisions. Herein, a trust level can be used as a measure to assess the level of belief and dependence that one entity (such as a user, a mobile device, a communication node, and the like) put into another entity. The trust level can be derived from direct or indirect knowledge/experience on earlier interactions of entities.

For communications in PSN, especially crucial communications, it is important to set up a secure communication channel among trustworthy users in order to avoid malicious eavesdropping. In the previous work, some centralized solutions are proposed to control data access for a secure communication based on general trust levels generated by a centralized trusted server, and some hybrid solutions are proposed to control data access for secure communications based on general trust level and/or local trust level. However, these centralized and hybrid solutions may be not suitable for providing a secure communication in a distributed manner, such as in PSN, because they rely on a centralized trusted server to generate and to issue data access keys. Thus they may be not able to support the situations that the centralized trusted server is not available or trusted at all. For example, in the case of an urgent disaster and military activities, these centralized and hybrid solutions may be impractical due to unavailability of a centralized trusted server. Another weakness of these solutions is that the server may be the target of Denial of Service (DoS)/Distributed DoS (DDoS) attacks or other kinds of attack. Once the server is broken or down, the reliability of the whole system could be greatly influenced. Although it is possible to setup a backup server, the connection availability would still be a problem in some practical situations. In practice, a fully trusted server is hard to achieve, the internal attackers inside the server may intrude the system. Meanwhile, communications between communication nodes and a centralized server would introduce extra cost.

Furthermore, due to the dynamic characteristic of a PSN topology and the frequent changes of each user's trust level, for securing PSN communications, the decryption key need to be frequently changed and distributed to each eligible user. This introduces a heavy traffic and processing load, which may cause a serious performance bottleneck.

Nowadays, trust, security and privacy aspects in pervasive social networking have not been seriously considered in most existing work in industry. For example, the traditional centralized social networking systems (e.g., facebook) have not taken user privacy and security into concern. They cannot satisfy instant social networking demands, especially when users do not have an internet connection, but with a location proximity. As such, issues on a trust management for security assurance and privacy enhancement need to be serious researched, in order to deploy a practical pervasive social networking system that can be easily accepted by mobile users. A number of crucial issues with regard to trust, security and privacy should be solved towards a trustworthy pervasive social networking. However, most existing work don't consider how to control data access of secure communications based on trust, especially in instant and distributed social networking scenarios.

Generally, an access control of communication data applies data encryptions, so that the encrypted data can only be decrypted by users with permissions. The ideal approach is to encrypt each data once, and distribute appropriate keys to users once, so that each user can only decrypt his authorized data. Previous work seldom controlled access to communication data based on the level of trust although trust is a crucial factor that should be considered in the process of authorizing data access. As mentioned already, in PSN, due to the frequently user changes and trust level changes, the decryption key needs to be frequently changed in order to achieve expected security level. As such, a pure symmetric key based encryption is not suitable for a PSN scenario, because the key is hard to be managed in a distributed way. It is complicated to control an access of communications data based on a trust level and other policies. Meanwhile, a public key based encryption is also not suitable for the PSN scenario, especially community-based instant social activities, when a number of users join together for communicating. This is because this encryption scheme is not efficient for multicasting/broadcasting data to a group of users. Data should be encrypted by the data owner for each target receiver.

There is another difficulty faced by the control of the security of a social communication regarding a user revocation. The user revocation means that the data owner withdraws access rights from users, for example, who no longer belong to a group or due to other reasons, e.g., the user is not trustworthy enough. Since the revoked users still retain the decryption keys issued earlier, and thus can still decrypt the encrypted data. As such, the data owner may need to encrypt its data with new keys, so that the revoked users cannot decrypt the recent data any more using their old keys, and redistribute the new keys to the remaining authorized users, so that they can still access the data. Obviously, the key re-generation and management will introduce an extra computing load and make the system complicated.

According to various exemplary embodiments, an efficient and secure communication can be provided based on a trust level in a distributed manner by applying an encryption theory for encrypting and decrypting based on attributes, for example, according to an Attribute-based encryption (ABE) scheme. The attribute-based encryption (ABE) is a newly developed cryptographic technique. According to the ABE scheme, users are identified by a set of attributes rather than an exact identity. Each data is encrypted with an attribute-based access condition constructing an access policy of the data, such that only users whose attributes satisfy the access condition can decrypt the data. For example, for data D, encrypted with the access condition A1 or A2, either users with attributes satisfying A1 or users with attributes satisfying A2, can decrypt D. Recently ABE is widely applied in secure data storage for cloud computing. But none of existing work proposes providing secure communications based on the trust level in a distributed manner, such as in pervasive social networking.

In various embodiments, a new approach is provided to securely access communication data in pervasive social networking purely based on trust levels which are locally evaluated by PSN nodes in a distributed manner (i.e. without any support of a centralized server). Based on the distributed trust evaluation, the various embodiments can support a secure communication in distributed manner by issuing a data encryption key using a trust controlled attribute-based encryption. In an exemplary embodiment, each node in a PSN can generate a key (hereinafter called as a communication key) for the data encryption of its communication with other nodes, so that only those eligible nodes (e.g. the users permitted to have a corresponding decryption key) can decrypt the encrypted communication data. For example, the communication key used for the communication of a user u can be denoted as $S\_u$, and similarly the communication key used for the communication of a user u' can be denoted as $S\_u'$. In some exemplary embodiments, the communication key can be a symmetric key. The communication data can be of any type, such as message, instant message, media content (e.g., images, video, audio, etc.), file, stream, and the like. Meanwhile, each node in a PSN can further generate an encryption public key, and secret keys personalized for each of other nodes, based on the locally evaluated trust level for encrypting and decrypting the communication key respectively. Then, it issues the personalized secret keys to those eligible nodes that satisfy the conditions for access of its communication data. For example, a condition is that a locally evaluated trust level of an eligible node (e.g. trust level of a user of the eligible node) should be greater than a threshold. The communication key encrypted by the encryption public key can be broadcast/multicast to the other nodes, for example together with the communication data that are encrypted by the communication key. Alternatively, the encrypted communication key can be multicast merely to the eligible nodes together with the personalized secret keys. As such, the communication data can only be decrypted by the eligible nodes that are authorized to decrypt the encrypted communication key. Then, the malicious eavesdropping can be avoided for the communications between the node and the eligible nodes.

In case that some eligible nodes need to be revoked, for example when the local trust levels of these nodes have a big change and do not satisfy the conditions for access the communication data, the node can regenerate a new communication key and then encrypt the new communication key with the encryption public key. Then, the communication data of the node will be encrypted with the new communication key. Meanwhile, the newly encrypted communication key is multicast to the current eligible nodes, for example whose current trust levels are above a threshold. As a result, the revoked nodes cannot access the communication data with their old communication keys and personalized secret keys any more.

FIG. 1 is a diagram of a system capable of providing a secure communication based on trust evaluations in a distributed manner according to an embodiment. As shown in FIG. 1, the system 100 comprises communication nodes 101 that can be self-organized and communicate with each other by forming a distributed communication network 103, for example a multi-hop radio network, and maintaining connectivity in a decentralized manner. The communication nodes 101 can be any type of user equipment, network node, server, and other communication devices applicable to communication in a distributed communication. For example, the communication nodes 101 can be user equipments, such as mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the communication nodes 101 can support any type of interface to the user (such as "wearable" circuitry, etc.).

The distributed communication system may be applied for pervasive social networking (PSN). For example, several PSN nodes 101a-101x may be utilized to perform social networking activities for communicating with each other. By way of example, communications of the PSN can be supported by one or more networking means such as MANET, Bluetooth, WLAN and the like. It is contemplated that the proposed method also may be applied to any other suitable scenarios where a secure communication in a distributed manner (without any support of a centralized service) may be needed.

The solutions according to the exemplary embodiments can provide a secure and flexible access control of PSN data, by using a local trust level based on distributed node trust evaluation. In this regard, a local trust value means that the trust level is generated locally at each PSN node without any support of a centralized service. For example, each PSN node (such as 101*a*, 101*b*, 101*c*, ..., 101*x*) can perform various social activities and networking with other PSN nodes, such as making a remote call to other PSN nodes, accessing internet to talk to other PSN nodes, sending short messages to other PSN nodes, and conducting instant social activities based on the communication network 103. As such, each PSN node can evaluate the local trust value of any of the other PSN nodes locally, for example based on the accumulated behavior data of the various social activities, and other local information.

There are various solutions for generating/evaluating a trust value/level of each node. In an embodiment, the trust levels can be evaluated automatically by a PSN node (such as 101*a*, 101*b*, 101*c*, ..., 101*x*) based on mobile social networking activities. Alternatively or additionally, the trust levels can be entered by the user. In an embodiment, a PSN node can evaluate the trust levels not only based on the mobile social networking activities accumulated by itself, but also based on related information obtained from other PSN nodes, such as trust levels evaluated by the other PSN nodes. In some embodiments, a PSN node (e.g. 101*x*) may be configured to implement a trust evaluation algorithm, which may evaluate a trust level of another PSN node (e.g. 101*a*), by using the identities of node 101*x* and the node 101*a* and the behavior data of various PSN activities of the PSN node 101*a*. The identity of a PSN node can be unique to the particular PSN node, such as the telephone number of the user of the node, universal resource identifier, and the like. In an embodiment, the trust level can be normalized into a range of (0, 1). However, it is contemplated that the trust level needs not to be normalized, or can be normalized to any range.

Based on the local trust evaluation, each PSN node can set data communication control based on trust levels, contexts and other limitations, such as a time period, a group of eligible user identities, etc. In a certain example, the PSN node 101*x* can set an access policy for the chat of taxi ride sharing as that, if the chat occurs in the office of the user of the PSN node 101*x*, an eligible PSN node's trust level should be greater than 4, while if the chat occurs in a street, an eligible PSN node's trust level should be greater than 8. It is contemplated that the access policy can be set in any ways, to satisfy various necessities of the PSN communications. Based on the access policy, each PSN node can encrypt the communication key to be used for securing its communications, for example according to an ABE scheme by taking a trust level as an attribute of an access policy. In the certain example, for ensuring their chatting being accessed by a number of trustworthy nodes, the communication of the chatting can be encrypted with a symmetric key by the PSN node 101*x*. Meanwhile, the node 101*x* can send to the other nodes the encrypted symmetric key, which is encrypted according to an ABE scheme by taking a threshold of trust level as an attribute of an access condition. Furthermore, the decryption keys for the symmetric key are issued only to the nodes having a sufficient trust level locally evaluated by the node 101*x*, e.g. a trust level greater than or equal to the threshold of trust level.

In an exemplary embodiment, the PSN 101*x* may be configured to implement an initiation algorithm using an identity of the PSN node 101*x* to generate a public key (denoted as PK_u) of its user (denoted as u) and a secret key (denoted as SK_u) of its users. For example, a public key and a secret key of a user u' of another PSN node can denoted as PK_u' and SK_u'. The PK_u, SK_u, (or PK_u', SK_u') can be generated during a system setup procedure of a PSN node. As noted previously, the identity of the PSN node 101*x* can be a pseudonym of the node 101*x*, a telephone number of user u, a universal resource identifier of the user u or the node 101*x*, or the other kind of identity which is unique for the PSN node 101*x*, for example globally or in the PSN. The binding of the keys SK_u and PK_u of a node to a unique identity of the node can facilitate the verification of the node's attributes. In some exemplary embodiment, a PK_u can simply be the unique identity of the node or a part of the unique identity.

Every node can maintain a PK_u and a SK_u. A PK_u of a node can be used by another node (e.g. a peer PSN node) to generate secret keys personalized for the node. A SK_u of a node can be used by itself in the decryption operation related to the PK_u. For example, a public key PK_u' of a PSN node (e.g. 101*a*) can be used by its peer PSN node (e.g. 101*x*) to generate a secret attribute key personalized for the node 101*a*, and then a secret key SK_u' of the PSN node 101*a* can be used for the decryption of a cipher-key (e.g. an encrypted communication key) in connection with the secret attribute keys personalized for the PSN node 101*a*. The personalized secret attribute keys can be issued to the PSN node 101*a* by the peer PSN node 101*x*. In this regard, the peer node 101*x* may be configured to generate the secret attribute keys personalized for each eligible node u' by using its secret key SK_u, and the public key PK_u' of each eligible node.

In an exemplary embodiment, the personalized secret attribute keys can be issued to respective eligible nodes based on trust levels of the respective nodes. Furthermore, a local trust level can also be utilized as an attribute to generate a public attribute key, for representing an access condition for the communication data based on a trust level (e.g. a threshold of trust level). For example, in a scenario, a PSN node would like to allow only other PSN nodes with local trust level over 4 to access its communication data. Then, the PSN node can encrypt its communication data with an access condition S1: lt>=4, wherein lt is used to represent the local trust level evaluated by the node for the other nodes.

According to an ABE scheme, each attribute is associated with an access condition, and an access policy is a set of access conditions, for example required for different communication contexts. An access policy can be described in a Disjunctive Normal Form (DNF). For example, an access policy (denoted as AA) in DNF can be written as:

$$AA = \bigvee_{j=1}^{n} \left( \bigwedge_{A \in S_j} A \right) \quad (1)$$

where $S_j$ denotes the j-th access condition in an access policy, and n is the total number of S (n=1, 2, 3, ...). A denotes an attribute that occurs in the j-th conjunction of AA. S can be a set of attributes, and S1, S2, ..., Sn, are not pairwise disjoint.

For example, a threshold of local trust level 4 can be set as an attribute to indicate an access condition: lt>=4, which means that only those nodes with a trust level greater or equal to 4 can access the communication data. An access condition S1 can comprise only one attribute (the local trust level). It is contemplated that the access condition S1 can further comprise any other attributes regarding limitations to access of the communication data, such as valid time period, valid location, and the like. An access policy can comprise one or more access conditions associated with different context. For example, in the previous certain example about a PSN chatting for taxi ride sharing, the access policy can comprise another access condition S2, which may limits that only those nodes with a trust level over or equal to 8 can access the communication data by an attribute: lt>=8.

In order to control access to the communication data according to an access policy, public attribute keys associated respective attributes can be used to encrypt the communication key. In an exemplary embodiment, a node may be configured to perform a local-trust-public-key-creation algorithm for using the attribute regarding a local trust level (also called a trust level related attribute, and denoted as LT) and its secret key of user SK_u to generate a public attribute key (denoted as PK_LT). For example, the public attribute key can be generated whenever the PSN node 101x would like to control the access to its communication data (e.g. PSN chatting messages). The local-trust-public-key-creation algorithm can check the access policy for the communication data. When there is a trust level related attribute, a public attribute key PK_LT can be generated based on LT. When there is no such an attribute, there is no public attribute key of the attribute LT generated. For example, the output of the algorithm for PK_LT is NULL.

Then, the PSN node 101x may be configured to perform a encryption key algorithm for using the public attribute keys (such as PK_LT) associated with attributes (such as LT) of an access condition indicated by the access policy, to encrypt the communication key. In an example, the encryption key algorithm can take as input the communication key S_u, an access policy AA, and the public attribute key PK_LT corresponding to the trust level related attribute occurring in an access condition S indicated by the policy AA, and then output the encrypted communication key, a cipher-key CK. In some exemplary embodiments, the encryption key algorithm may iterate over all j=1, . . . , n, to generate for each conjunction Sj a random value R_j and constructs CK_j corresponding to each Sj. For example, the cipher-key CK can be obtained as a tuple CK:=<CK_1, CK_2, . . . , CK_n>. As such, the PSN node 101x can protect its PSN communication key S_u according to an ABE mechanism. In some exemplary embodiments, the access policy AA can be set by the PSN node 101x, and informed to the other nodes (e.g. a PSN node 101a, 101b, 101c, . . . ). In some exemplary embodiments, the access policy AA can be a default policy, which may be commonly known by all nodes in the PSN.

Further, the PSN node 101x can protect its communication data with the PSN communication key S_u. In this regard, the PSN node 101x may be configured to perform a data encryption algorithm for using the PSN communication key S_u, an access policy AA regarding the local trust level, and the communication data (such as PSN chatting messages, denoted as M) to generate the encrypted communication data, such as a ciphertext CT.

In some exemplary embodiments, to access the communication data of the PSN node 101x, the other nodes (such as the PSN nodes 101a, 101b, 101c, . . . ) can request at least one of the encrypted communication key CK and the personalized secret attribute keys. For example, the PSN node 101a may request the encrypted communication key CK and the secret attribute keys personalized for itself from the PSN node 101x. The request may occur when the PSN node 101a decides to communicate with the PSN node 101x, for example after receiving the encrypted communication data broadcasted from the PSN node 101x. In some exemplary embodiment, the PSN node 101a can evaluate a local trust level of the PSN node 101x, in a similar way as discussed above with respect to the PSN node 101x. Then, the PSN node 101a can check whether the PSN node 101x is trustworthy to communicate with based on the evaluated local trust level. In some other exemplary embodiments, at least one of the encrypted communication key and the personalized secret attribute keys can be issued by the PSN node 101x in an unsolicited manner.

Then the encrypted communication key of the PSN node 101x can be decrypted by the PSN node 101a with the personalized secret attribute keys for the PSN node 101a. Each of the secret attribute keys corresponds to respective public attribute keys, and is personalized to each node. To prevent collusion, each node will get a different secret attribute key that only itself can use. For example, a secret attribute key of a trust level related attribute LT, issued for a use u' (e.g. of the PSN node 101a) by a user u (e.g. of the PSN node 101x) can be denoted as SK_(LT,u,u'). As such, a node 101a can obtain a set of secret keys (i.e., the key SK_u' and all keys SK_(TL,u,u')), which can be called as its key ring.

Before issuing the encrypted communication key and the personalized secret attribute keys, a node can check whether the local trust level of the peer node with a public key PK_u' (and/or a unique ID u') can satisfy the access condition with regard to the trust level related attribute LT (e.g., LT>=4). When the trust level of the peer node satisfies the access condition, this peer node u' can be identified as an eligible node, and a personalized secret attribute key (such as SK_(LT, u, u')) corresponding to the attribute can be issued to the peer node. In some exemplary embodiments, the PSN node 101x can be configured to perform a local-trust-secret-key-issue algorithm for using the attribute LT, an unique identity u' of a PSN node (e.g., PK_u'), and the secret key SK_u of the node 101x, to generate a secret attribute key SK_(LT,u,u') personalized for the node 101a, according an ABE scheme. In an exemplary embodiment, SK_(TL,u,u') can be generated by the node 101x in response to a request from the node 101a. In this regard, for example, when node 101a is eligible, the local-trust-secret-key-issue algorithm can generate a correct secret attribute key SK_(TL,u,u') corresponding to the attribute LT, otherwise the output of the algorithm may be NULL. In an exemplary embodiment, the personalized secret attribute keys SK_(TL,u,u') can be sent to the node 101a by the node 101x in a secure manner, for example by encrypting SK_(TL,u,u') with the public user key PK_u' of the node 101a.

With these secret attribute keys, the node 101a can decrypt the encrypted communication key used by the node 101x for securing its communications. In some exemplary embodiments, the node 101a can be configured to perform a decryption key algorithm for using the cipher-key CK produced by the corresponding encryption key algorithm, a key ring SK_u' and SK_(LT,u,u') for the node 101a, and the access policy AA under which CK was encrypted, to generate the corresponding plain-key, i.e. the communication key. When the attributes of a node 101a is sufficient to satisfy the access condition indicated by the access policy AA, a correct communication key can be obtained by the node 101a. Otherwise, the encrypted communication key cannot be decrypted. For example, the output of the decryption key algorithm may be NULL. This decryption of the encrypted communication key can be executed when an eligible node would like to access the communication data of a node. For example, when the node 101a receives a PSN chatting message from the node 101x, the node 101a can firstly checks the access policy AA of the encryption to determine which access condition is applied in the encryption of the encrypted communication key, and then conducts the corresponding decryption with the key rings associated with the applied access condition. As noted previously, in some exemplary embodiments, the access policy AA can be set by the node u, and informed to the other node u'. Alternatively, the access policy AA can be a default policy which is commonly known by all nodes in the PSN including the nodes u and u'.

With the decrypted communication key, the node 101a can then access the encrypted communication data. In some exemplary embodiments, the node 101a may be configured to perform a decryption algorithm for using the encrypted PSN communication message CT, the communication key S_u, and the access policy AA about the local trust, to obtain the plaintext M. As such, the node 101a can disclose the content of the communication data of the node 101x.

Figure 2:
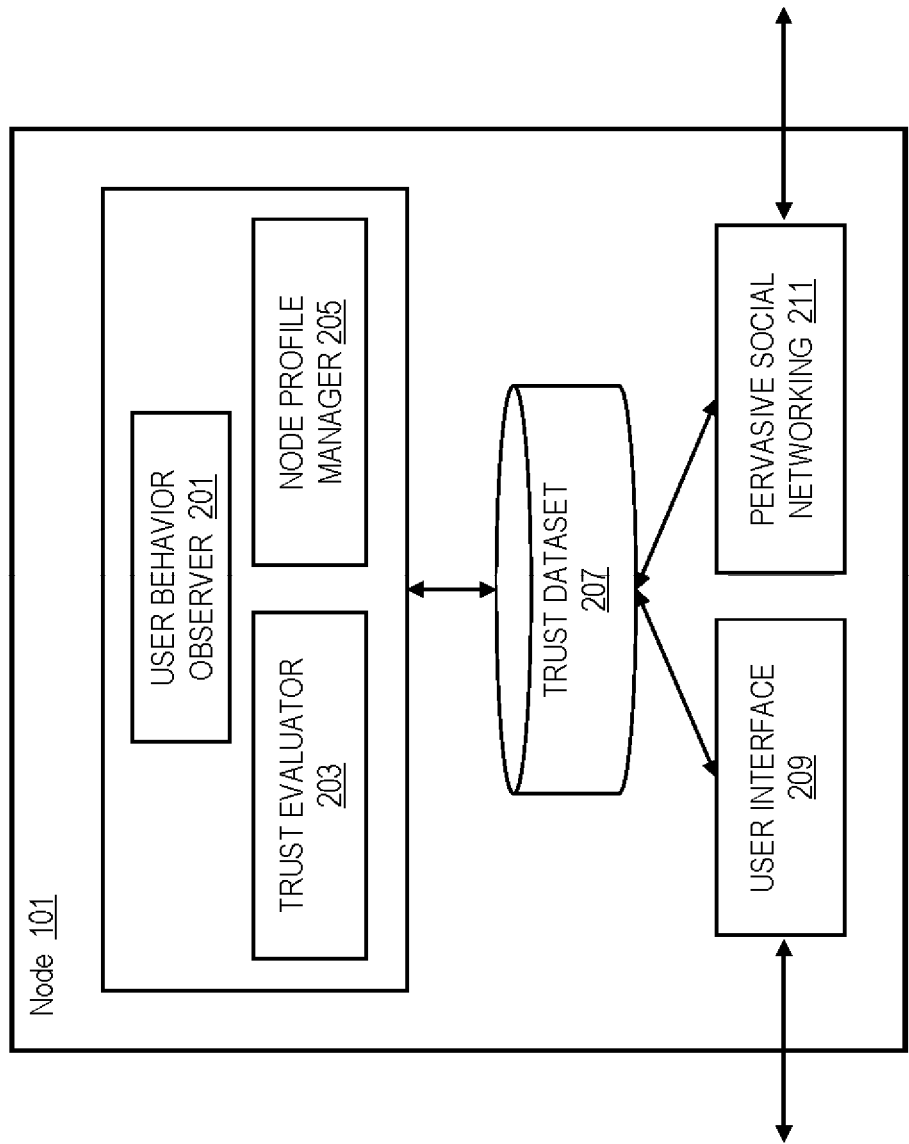
FIG. 2 is a diagram of the components of user equipment capable of providing a secure communication based on trust evaluations in a distributed manner, according to one embodiment

FIG. 2 is a diagram of the components of user equipment capable of providing a secure communication based on trust evaluation in a distributed manner according to one embodiment. It is contemplated that the functions of these components may be combined in one or more components or performed by other components of equivalent functionality. In this embodiment, the communication node 101 can includes a user behavior observer 201 to record social behaviors of nodes in the communication network, a pervasive social networking module 211 to provide various social networking functionalities for a user of the node to do various pervasive social networking.

The communication node 101 can further include a trust evaluator 203 to evaluate the local trust level of other nodes based on their social behaviors. As noted above, the trust evaluator 203 can evaluate trust levels locally. In an exemplary embodiment, the results of the evaluation can be provided to the user of the node 101 via a user interface 209.

In addition, the communication node 101 can further include a node profile manager 205 to maintain various personal information of the node 101. The node profile manager 205 can be further responsible for generating cryptography keys related to a secure PSN communication, such as the communication key S_u, the public key PK_u and secret key SK_u, the public attribute key PK_LT and secret attribute key SK_LT discussed above. The cryptography keys may be provided to the pervasive social networking module 211 to secure a PSN communication.

All data related to the above functional blocks in the node 101, such as records of the social behavior, the evaluated trust level, the cryptography keys related to secure PSN communications, and the like, can be stored in a trust dataset 207. For example, the trust dataset may be settled in the node 101 or connected to the node 101. In an exemplary embodiment, the data can be stored in a secure manner in the trust dataset 207.

In some exemplary embodiments, the user behavior observer 201 can collect social networking activities of other nodes via the pervasive social networking module 211. The records of social networking activities can be utilized by the trust evaluator 203 to evaluate the local trust levels of other nodes. In turn, the evaluated trust levels can be utilized by the node profile manager 205 to generate cryptography keys related to secure a PSN communication. The node 101 may utilize the user interface 209 to interact with users, and a pervasive social networking module 211 to interact with other nodes 101. For example, the pervasive social networking module 211 may be utilized to communicate data with other nodes, issue and/or request a communication key S_u and personalized secret attribute keys SK_LT from the other nodes.

In certain embodiments, the pervasive social networking module 211 may includes a set of pervasive social networking applications which can be run on the node 101. The pervasive social networking module 211 may further include multiple means of communication. For example, the pervasive social networking module 211 may be able to communicate over SMS, internet protocol, instant messaging, voice sessions (e.g., over an internet protocol), or other types of communication. In some examples, the pervasive social networking module 211 can be used to transmit and receive information using protocols and methods associated with the user behavior observer 201 and the node profile manager 205.

The user interface 209 can include various means of communication. For example, the user interface 209 can have outputs including a visual component (e.g., a screen), an audio component, a physical component (e.g., vibrations), and other means of communication. User inputs can include a touch-screen interface, a scroll-and-click interface, a button interface, etc. In certain embodiments, the user interface 209 may additionally have a vocal user interface component. As such, a text-to-speech mechanism may be utilized to provide textual information to the user. Further, a speech-to-text mechanism may be utilized to receive vocal input and convert the vocal input into textual input. Moreover, the user interface 209 may be utilized to present information and content associated with the trust evaluation, and receive inputs of a user associated with the trust evaluation.

Figure 3:
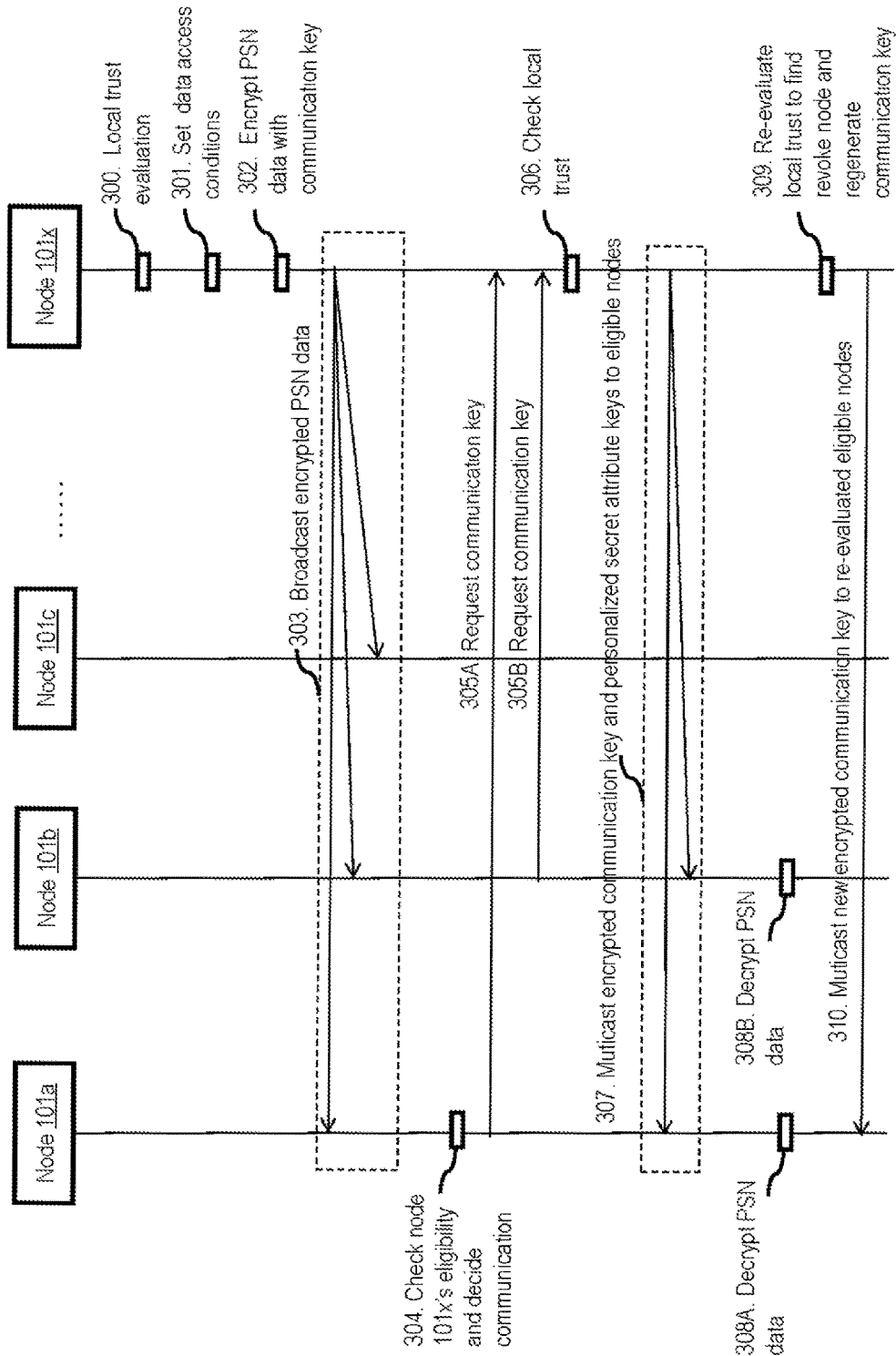
FIG. 3 is a flowchart of a overall system process for providing a secure communication based on trust evaluations in a distributed manner according to an embodiment.

FIG. 3 is a flowchart of an overall system process for providing secure communications based on trust evaluations in a distributed manner according to an embodiment. In an exemplary embodiment, when a node (such as the node 101x) in PSN wants to secure its data communication with the nearby nodes (such as 101a, 101b, 101c, . . . ) based on its local trust evaluation, the node 101x can generate a symmetric communication key S_(u), and corresponding public attribute key PK_LT and personalized secret attribute keys SK_LT based on the local trust level for encrypting and decrypting S_(u). The node 101x can issue the personalized secret attribute keys SK_LT to those nodes that satisfy the decryption conditions. The encrypted PSN data can be broadcast to the nearby nodes. Only those nodes that satisfy the access control policy (which can be called as eligible nodes) can decrypt the key and then decrypt the PSN data. The detailed procedure is shown in FIG. 2 and described as below.

In an exemplary embodiment, the node 101x can evaluate (step 300) trust levels of other nodes (including the nodes 101a, 101b, 101c, . . . ), for example based on pervasive social networking activities, behaviors and experiences. This trust evaluation can be periodically executed, or triggered for example by bad experiences. As noted previously, the trust evaluation is executed in a distributed manner, without any support of a centralized server. In an exemplary embodiment, the trust levels of the node 101a can be evaluated locally at the node 101x, by calling the trust evaluation algorithm as described above, by using the identities of node 101x and the node 101a and the behavior data of various PSN activities of the PSN node 101a.

Based on the trust evaluation results, the node 101x can set (step 301) data access conditions for its data communication, such as a threshold of trust level, constituting an access policy. In another embodiment, the access conditions can be set as default access conditions, and can be commonly known to all nodes in the PSN.

To secure the data communication, the node 101x can encrypt (step 302) its PSN data M with a symmetric communication key S_u, for example, by calling the encryption algorithm as discussed above which uses S_u, AA, and M as input and output the encrypted communication data CT. Then, the node 101x can broadcast (step 303) its encrypted PSN data to the nearby nodes, such as 101a, 101b, 101c. In some exemplary embodiments, the node 101x can generate a symmetric encryption key if needed. For example, when the trust levels of other nodes have reduced compared to a previous trust level evaluation, the node 101x can generate a symmetric communication key S_(u). When the trust levels of other nodes do not changed, the node 101x can use the communication key which was generated previously.

At least one of the nearly nodes, e.g. the node 101a and 101b, may receive the PSN data from the node 101x, and decide to access the PSN data or communicate with the node 101x. In an exemplary embodiment, the decision can be made by checking the eligibility of the node 101x. For example, the node 101a can evaluate and check a local trust level of the node 101x at step 304. In an embodiment, the node 101a may be configured to implement a trust evaluation algorithm similar as described above, for using the identities of the node 101a and node 101x and the behavior data of various PSN activities of the PSN node 101x to evaluate a trust level of the PSN node 101x. Then, the node 101a and 101b can send requests (305) for the symmetric communication key S_(u) from the node 101x, respectively. In some exemplary embodiment, the requests can carry the public user key and/or the unique identity of respective request nodes.

The node 101x can check (306) the local trust levels of the node 101a and 101b. When they satisfies the access policy, and the node 101x can issue (307) to each of the eligible nodes an encrypted communication key and respective secret attribute keys personalized each of the eligible nodes. For example, the encrypted communication key can be multicast to the eligible nodes, together with secret attribute keys. In some exemplary embodiments, when the node 101x hasn't generated a public encryption key and/or corresponding personalized secret attribute keys for these eligible nodes, the node 101x can generate proper keys for eligible nodes. For example, the node 101x can call a local-trust public-key-creation algorithm for using a trust level related attribute LT and its secret user key to generate the public attribute key, and call a local-trust-secret key-issue algorithm for using LT, the secret user key of the node 101x, and at least one of the identity and public user key of the node 101a to generate personalized secret attribute keys for the node 101a, and for using LT, the secret user key of the node 101x, and at least one of the identity and public user key of the node 101b to generate personalized secret attribute keys for the node 101b. For example, the symmetric communication key can be encrypted by calling an encryption key algorithm which can use the communication key S_(u), access policy AA, and the public encryption key to get a CK.

In step 308, the eligible node 101a and 101b can decrypt the encrypted symmetric communication key with their personalized secret keys. For example, the node 101a can call a decryption key algorithm for using the CK, the access policy AA, the secret user key of the node 101a and the secret attribute key personalized for the node 101a to get the symmetric communication key. In a similar way, the node 101b can call a decryption key algorithm for using the CK, the access policy AA, the secret user key of the node 101b and the secret attribute key personalized for the node 101b to get the symmetric communication key. Then, they can get plain PSN data by decrypting the symmetric communication key, for example via calling the decryption algorithm described above. In an exemplary embodiment, the eligible nodes can utilize the decrypted symmetric communication key for communicating with the node 101x. In this regard, the eligible nodes can encrypt the PSN data sent from the eligible nodes to the node 101x by using the symmetric communication key.

Due to the dynamic change of trust level, a previous eligible node (e.g. the node 101b) may become distrusted, after it got from the node 101x the personalized secret attribute keys. In this situation, the node 101x won't allow the node 101b to access the PSN data communication any more although the node 101x has already issued to the node 101b the secret attribute keys. In this case, the node 101x will regenerate a new symmetric communication key and issue it to the current eligible nodes using the attribute based encryption through multicast. The later communication data sent from the node 101x will be then encrypted with the new symmetric communication key. In an exemplary embodiment, the node 101x can re-evaluate the trust levels of the nearby nodes to find the revoke nodes, whose re-evaluated trust level goes below the threshold, for example.

While the above embodiments have been described in a context that the node 101x provides secure communication based trust levels, it should be appreciated that each node in the PSN can provide secure communications between itself and other nodes in parallel and in a similar manner with the node 101x. Although many operations are described in a certain order with reference to FIG. 3, it should be appreciated that these operations can be performed in alternative orders, and some operations can be adjusted, combined, or even omitted. For example, the encrypted communication key can be issued to eligible nodes separately from the personalized secret attribute keys. In an example embodiment, the encrypted communication key can even be broadcast to all other nodes in an unsolicited manner, for example at the beginning of the PSN communication between the node 101x and its nearby nodes 101a-101c. Furthermore, it should be appreciated that encryption and decryption for the communication key can be implemented through any encryption theory for encrypting and decrypting based on attribute. For example, the public attribute key (e.g. PK_LT) and secret attribute key (e.g. SK_LT) and the related algorithms, such as the a local-trust-public-key-creation algorithm, the encryption key algorithm, the local-trust-secret-key-issue algorithm, and the decryption key algorithm, can be implemented with an Attribute-Based Encryption (ABE) scheme, or an ABE-IBS (Attribute-Based Encryption with Identity-Based Signature) based encryption scheme, or other suitable encryption theory based on the attribute regarding local trust level.

Figure 4:
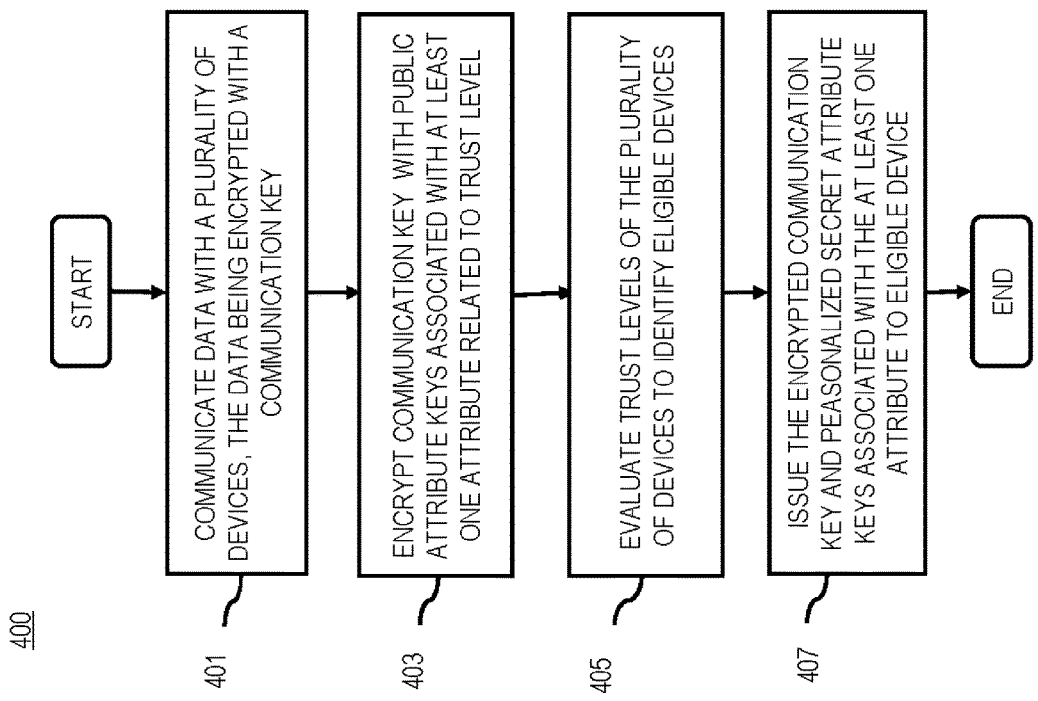
FIG. 4 is a flowchart of a process for providing a secure communication based on trust evaluations in a distributed manner, according to one embodiment.
Figure 5:
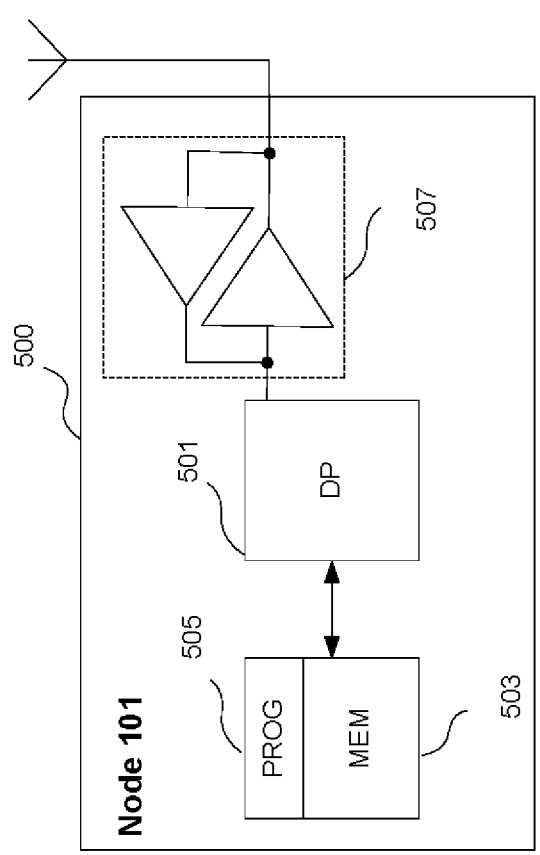
FIG. 5 is a simplified block diagram of various devices that are suitable for use in practicing various exemplary embodiments of the present invention.

FIG. 4 is a flowchart of a process for providing secure communication based on a trust level in a distributed manner, according to one embodiment. In such an embodiment, the process 400 is performed by one or more communication node (such as the PSN node 101x), and is implemented in, for instance, a chip set including a processor and a memory as shown in FIG. 5. As such, the communication node can provide means for accomplishing various parts of the process 400 as well as means for accomplishing other processes in conjunction with other components. In one embodiment, a trust evaluator 203 can be used to locally evaluate trust levels based on social networking activities in the PSN.

In step 401, a communication device (such as the PSN node 101x) can communicate data with a plurality of communication devices (such as the PSN node 101a, 101b, 101c), and the data are encrypted with a communication key. For example, the communication key can be maintained in the communication device, and/or generated by the communication device in response to the beginning of the communication or changes of a local trust evaluation.

In step 403, the communication device encrypts the communication key with public attribute keys (such as PK_LT,) associated with attributes, e.g. according to an ABE scheme. The attributes can comprises at least one trust level related attribute (such as LT) representing an access condition for the communication data based on a trust level. In one embodiment, the access condition can be set by the communication devices.

In step 405, the communication device can evaluate a trust level of each device of the plurality of devices, to identify eligible devices whose trust levels satisfy the access condition. In some exemplary embodiments, the evaluation can be performed in response to receive a request, for example for accessing the communication data. In some exemplary embodiments, the evaluation can be performed automatically. Based on the evaluated trust level, the communication device can identify eligible devices of the plurality of devices whose trust levels satisfy the access condition. For example, the communication device can check whether the trust level of a device is greater or equal to a predetermined threshold. When the trust level of a device meets (e.g. greater or equal to) the threshold, it can be determined that the device is eligible. Otherwise, the device is ineligible.

Next in step 407, the communication device issues the encrypted communication key (such as CK) to the eligible devices. Furthermore, the communication device issues secret attribute keys (such as SK_LT) associated with the attributes to each device of the eligible devices, wherein the secret attribute keys are personalized for the each device of the eligible devices. Then, the eligible devices can decrypt the encrypted communication key by using their respective personal secret attribute keys, and then decrypt the encrypted communication data with the decrypted communication key. In some exemplary embodiment, the encrypted communication key and the secret attribute keys are multicast to the eligible devices in response to a request from the eligible devices.

In some exemplary embodiments, the communication device can inform an access policy of the communication data to the plurality device, wherein the access policy indicates a corresponding access condition used for a particular access context. Then, the secret attribute keys can be generated based on the identity of each eligible device and the at least one trust level related attribute TL representing the corresponding access condition indicated by the access policy.

As such, it is flexible for the communication devices to control a data communication, no matter if there is a centralized server to manage cryptography keys or not. This is because that the corresponding cryptography keys can be managed by each node locally, and then the data communication can be secured in a distributed manner. Meanwhile, no matter what new device joining the communication or old device leaving the communication, each communication device only need to generate one public attribute key, and generate secret attribute keys for another particular communication device for one time. Meanwhile, whether issuing the personalized secret attribute keys for getting the communication key or not can be controlled by the local trust evaluation.

In various embodiments, the secure communication is provided in a distributed manner. In this regard, the trust can be evaluated and managed in a distributed manner to support a distributed access control demand, for example in a pervasive social networking. Furthermore, personal access policies can be handled by each individual device. Each communication device can set its own data access policy and manage the corresponding keys by itself.

Through various embodiments, the security of the communication can be ensured by the attributed-based encryption theory and the symmetric key encryption theory. In some exemplary embodiments, the security can be further ensured by fine-grained encryption mechanism controlled by the frequency of trust evaluation at each communication node device. The symmetric key can be regenerated and issued to current eligible node devices if needed, for example when the trust levels of some devices are changed to unmeet the threshold. Meanwhile, since the trust management is distributed, various embodiments can fight against the DoS and DDoS attack on a centralized server that manages keys and personal information of all PSN nodes.

Furthermore, in various embodiments, the computational cost is low. As noted above, to provide secure communications of a device, the device needs to generate the attribute-based encryption keys (including PK_LT and SK_LT) once based on its access policy, and does not need to generate these keys multiple times due to trust level changes. Meanwhile, the cost for generating the communication key (e.g. a symmetric key) is very low. In some embodiments, the communication key can be controlled by the local trust evaluation, and thus the regeneration of communication key is not always needed during the communication. The re-generated communication key will be issued to the current eligible nodes through multicast.

Now reference is made to FIG. 5 illustrating a simplified block diagram of various electronic devices that are suitable for use in practicing the exemplary embodiments of the present invention. In FIG. 5, a communication node 500 (such as the PSN node 101a, 101b, 101c, 101x) is adapted for communication with other communication devices (such as PSN node 101a, 101b, 101c, 101x). A control for secure communications between these communication nodes can be executed according to the exemplary embodiments of the present invention as discussed above.

The node 500 includes a data processor (DP) 501, a memory (MEM) 503 that stores a program (PROG) 505, and a suitable transceiver 507 for communications with other communication nodes via one or more communication networks. In an exemplary embodiment, the transceiver 507 can be a suitable radio frequency (RF) transceiver for bidirectional wireless communications via one or more antennas. The PROG 505 is assumed to include program instructions that, when executed by the DP 501, enable the user equipment to operate in accordance with the exemplary embodiments of this invention, as discussed above. That is, the exemplary embodiments of this invention may be implemented at least in part by computer software executable by the DP 501, or by hardware, or by a combination of software and hardware. The basic structure and operation of the communication node 500 are known to one skilled in the art.

The MEM 503 may be of any type suitable to the local technical environment and may be implemented using any suitable data storage technology, such as semiconductor based memory devices, flash memory, magnetic memory devices and systems, optical memory devices and systems, fixed memory and removable memory. The DP 501 may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-Limiting and exemplary embodiments of this invention.

What is claimed is:

1. A method, comprising:
sending, by a user equipment, data to a plurality of devices in a distributed communication network including the user equipment, the data being encrypted with a communication key;
encrypting, by the user equipment, the communication key with public attribute keys associated with attributes, wherein each attribute is associated with an access condition that indicates a corresponding trust level with a threshold for accessing the data, wherein the access condition and the corresponding trust level are established by the user equipment;
evaluating, by the user equipment, a trust level of each device of the plurality of devices, to identify eligible devices of the plurality of devices, the eligible devices comprising a subset of the plurality of devices whose trust levels satisfy the access condition by at least meeting the threshold of the corresponding trust level;
sending, by the user equipment, the encrypted communication key to the plurality of devices; and
sending, by the user equipment, secret attribute keys associated with the attributes to each device of the eligible devices for decrypting the encrypted communication key, the secret attribute keys being personalized for the each device of the eligible devices.

2. The method of claim 1, further comprising:
re-evaluating, by the user equipment, the trust level of the eligible devices after sending the secret attribute keys, to re-identify eligible devices whose re-evaluated trust levels satisfy the access condition; and
when a device of the eligible devices becomes ineligible, updating, by the user equipment, the communication key to a new communication key, and sending the new communication key encrypted with the public attribute keys to the re-identified eligible devices.

3. The method of claim 1, further comprising:
setting, by the user equipment, the access condition for the data.

4. The method of claim 1, further comprising:
informing, by the user equipment, an access policy of the data to the eligible devices, wherein the access policy indicates a corresponding access condition to be used for a particular access context,
wherein the secret attribute keys are generated based on the identity of the each device of the eligible devices and the at least one trust level related attribute representing the corresponding access condition indicated by the access policy.

5. The method of claim 1, further comprising:
using, by the user equipment, the communication key to decrypt data received from the eligible devices.

6. The method of claim 1, wherein the sending of at least one of the encrypted communication key and the secret attribute keys is performed in response to a request from at least one eligible device of the plurality of devices.

7. The method of claim 1, wherein the trust level related attribute indicates a pre-determined threshold of trust level, and a device whose trust level meets the pre-determined threshold of trust level is identified as an eligible device.

8. The method of claim 1, wherein the trust level of the each device of the plurality of devices is evaluated based on social networking activities related to the each device.

9. The method of claim 1, wherein the communication key is a symmetric key.

10. The method of claim 1, wherein the encrypted data are broadcast or multicast, by the user equipment, to the plurality of devices.

11. The method of claim 1, wherein the encrypted communication key is multicast, by the user equipment, to the eligible devices together with the secret attribute keys.

12. An apparatus comprising:
at least one processor; and
at least one memory including computer program code,
the at least one memory and the computer program code configured to, with the at least one processor, cause the apparatus to at least:

send data to a plurality of devices in a distributed communication network including the apparatus, the data being encrypted with a communication key;
  encrypt the communication key with public attribute keys associated with attributes, wherein each attribute is associated with an access condition that indicates a corresponding trust level with a threshold for accessing the data, wherein the access condition and the corresponding trust level are established by the apparatus;
  evaluate a trust level of each device of the plurality of devices, to identify eligible devices of the plurality of devices, the eligible devices comprising a subset of the plurality of devices whose trust levels satisfy the access condition by at least meeting the threshold of the corresponding trust level;
  send the encrypted communication key to the plurality of devices; and
  send secret attribute keys associated with the attributes to each device of the eligible devices for decrypting the encrypted communication key, the secret attribute keys being personalized for the each device of the eligible devices.

13. The apparatus of claim 12, wherein the apparatus is further caused to at least:
  re-evaluate the trust level of the eligible devices after sending the secret attribute keys to re-identify eligible devices whose re-evaluated trust levels satisfy the access condition; and
  when a device of the eligible devices becomes ineligible, update the communication key to a new communication key, and send the new communication key encrypted with the public attribute keys to the re-identified eligible devices.

14. The apparatus of claim 12, wherein the apparatus is further caused to at least: set the access condition for the data.

15. The apparatus of claim 12, wherein the apparatus is further caused to at least:
  inform an access policy of the data to the eligible devices, wherein the access policy indicates a corresponding access condition to be used for a particular access context,
  wherein the secret attribute keys are generated based on the identity of the each device of the eligible devices and the at least one trust level related attribute representing the corresponding access condition indicated by the access policy.

16. The apparatus of claim 12, wherein the apparatus is further caused to at least: use the communication key to decrypt data received from the eligible devices.

17. The apparatus of claim 12, wherein at least one of the encrypted communication key and the secret attribute keys is sent in response to a request from at least one eligible device of the plurality of devices.

18. The apparatus of claim 12, wherein the trust level related attribute indicates a pre-determined threshold of trust level, and a device whose trust level meets the pre-determined threshold of trust level is identified as an eligible device.

19. The apparatus of claim 12, wherein the trust level of the each device of the plurality of devices is evaluated based on social networking activities related to the each device.

20. A non-transitory computer-readable storage medium carrying one or more sequences of one or more instructions which, when executed by one or more processors, cause an apparatus to at least perform the following:
  sending data to a plurality of devices in a distributed communication network including the apparatus, the data being encrypted with a communication key;
  encrypting the communication key with public attribute keys associated with attributes, wherein each attribute is associated with an access condition that indicates a corresponding trust level with a threshold for accessing the data, wherein the access condition and the corresponding trust level are established by the apparatus;
  evaluating a trust level of each device of the plurality of devices, to identify eligible devices of the plurality of devices, the eligible devices comprising a subset of the plurality of devices whose trust levels satisfy the access condition by at least meeting the threshold of the corresponding trust level;
  sending the encrypted communication key to the plurality of devices; and
  sending secret attribute keys associated with the attributes to each device of the eligible devices for decrypting the encrypted communication key, the secret attribute keys being personalized for the each device of the eligible devices.

* * * * *